Figure 1:
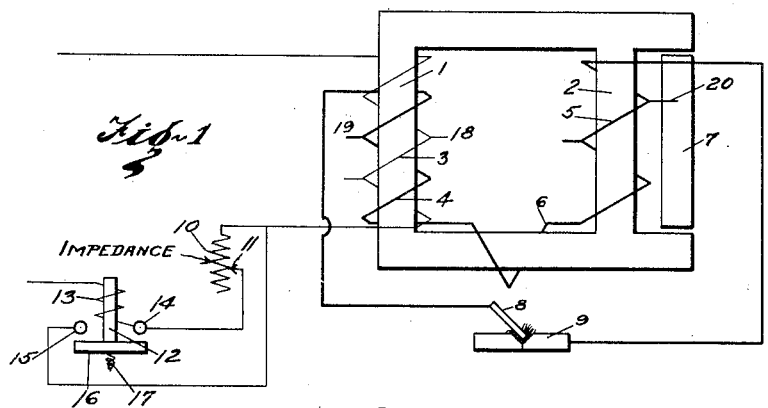

Jan. 15, 1924.

W. H. FLOOD ET AL 1,480,857

ELECTRIC ARC WELDING SYSTEM

Filed Sept. 2, 1920

INVENTORS
W. H. Flood
D. T. Smout
BY
A. D. T. Libby
ATTORNEY

Patented Jan. 15, 1924.

1,480,857

UNITED STATES PATENT OFFICE.

WALTER HERBERT FLOOD, OF TOOTING, LONDON, AND DONALD TRENTHAM SMOUT, OF WEST DULWICH, LONDON, ENGLAND, ASSIGNORS TO ELECTRIC ARC CUTTING & WELDING COMPANY, OF NEWARK, NEW JERSEY.

ELECTRIC-ARC-WELDING SYSTEM.

Application filed September 2, 1920. Serial No. 407,771.

*To all whom it may concern:*

Be it known that we, WALTER HERBERT FLOOD and DONALD TRENTHAM SMOUT, subjects of the King of Great Britain, residing at 56 Lucien Road, Tooting, London, and 175 Clive Road, West Dulwich, London, England, have invented certain new and useful Improvements in Electric-Arc-Welding Systems, of which the following is a specification.

Our invention relates to arc welding systems, particularly a system wherein alternating current is not only the source of power, but in which alternating current is used at the welding arc.

It has been found that an alternating current system, which utilizes alternating current at the welding arc, possesses many advantages over the direct current arc and in certain classes of work it is desirable to have a voltage, at the instant of starting the arc, considerably higher than the voltage required to sustain the arc after it has been started, but in some cases it is desirable to reduce this open circuit voltage previous to striking the arc, so that the operator will not get any serious shocks should he accidently come in contact with the exposed electrodes.

It is the object of our invention, therefore, to provide an alternating current welding system in which the open circuit voltage across the electrodes is reduced to a safe value, but such a system has the capability of at once adjusting itself to the conditions of the welding operations, whereby all the results of a high initial voltage are obtained without the objection of having the higher open circuit voltage applied to the electrodes.

Another object of our invention is to provide means for obtaining the above results in a cheap and inexpensive manner.

Other and further objects will be apparent to one skilled in this art after a study of the specification and the drawing annexed thereto.

In carrying out our invention, we have chosen to illustrate the same used in connection with a well-known type of alternating current transformer of the Holslag type. In the drawings, Figure 1 illustrates an AC welding transformer having our invention applied thereto.

Figure 2:
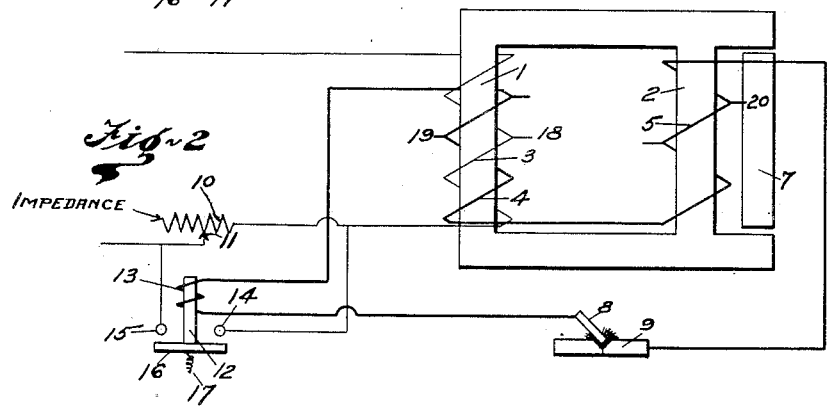

Figure 2 shows the same type of transformer as illustrated in Figure 1, but without a control device in the secondary circuit.

Figure 3:
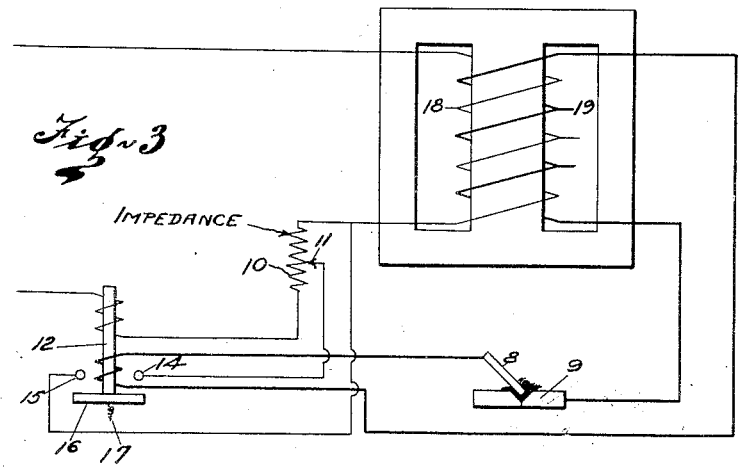

While Figure 3 is a view of a different type of transformer showing the control divided between the primary and secondary circuits.

Referring now to the details wherein like numbers refer to corresponding parts in the various views, 1 and 2 illustrate the legs of the transformer. The leg 1 carries the primary 3 and the main part 4 of the secondary winding. The balance or auxiliary part of the transformer winding 5 being carried on the leg 2. 6 illustrates steadying turns connected between the main and auxiliary winding. Flux diverter 7 is used for adjusting the amount of flux through the core leg 2. The terminals of the secondary winding shown in Figure 1 are connected to electrodes 8 and 9, 8 being the movable electrode and 9 the work which is to be welded together.

Connected in series with the primary winding 3 is an impedance coil 10, preferably made so that the impedance may be varied by an adjustable contact 11. A relay 12 having a winding 13 connected in series with the primary winding is adapted by means of the contacts 14 and 15 and armature 16 to short circuit the impedance coil 10 when the armature is energized. Normally the armature 16 is held in retractive position by a resilient member 17. When the electrode operations have been suspended the impedance coil 10 is in circuit with the primary winding which reduces the applied voltage thereto so that the voltage across the electrodes 8 and 9 on open circuit is reduced in proportion to the amount of impedance included in the primary circuit.

Just as soon as an arc is struck between the electrode 8 and the work 9, the heavy flow of current in the secondary circuit causes an increase flow of current in the primary circuit, which operates the relay 12, causing the contacts 14 and 15 to be drawn together by the armature 16 thereby short circuiting the impedance coil 10 and applying additional voltage to the primary winding, thereby increasing the output of the transformer. When the welding operations are suspended, the decreased current through the primary weakens the effect of the winding 13 on the relay 12 and the spring 17 retracts the armature 16 to its normal position, thereby establishing the open circuit conditions heretofore explained. Taps 18 on the primary, 19 on the main secondary and 20 on the auxiliary secondary are used for getting proper regulation of the welding current to suit the work that is to be performed.

In Figure 2 the winding 13 is in series with the secondary circuit, thereby placing the relay 12 immediately responsive to the breaking of the arc at the electrodes, thus removing the somewhat objectionable factor of having the winding 13 in the primary circuit.

In Figure 3 the shell type of transformer is illustrated and the relay 12 has a winding in series with the primary as well as the winding in series with the secondary or welding circuit. It being understood, however, that these windings are so proportioned as to give the required operation to the relay 12 to regulate the voltage at the welding terminals as hereinbefore described.

While we have shown somewhat diagrammatically, the application of our invention, we do not wish to be limited to any specific details other than as limited by the appended claims.

Having thus described our invention, what we claim is:

1. An arc welding system comprising a transformer having primary and secondary windings, an auxiliary winding connected in series relation to the secondary winding, a set of working electrodes connected to the secondary winding, an impedance device connected in series with the primary winding, and means for shunting the impedance from the primary circuit when current flows in the secondary winding.

2. An arc welding system comprising a transformer having primary and secondary winding, a set of working electrodes connected to the secondary winding, an impedance connected in series with the primary winding and means for shunting the impedance from the primary circuit when current flows in the secondary windings, said means including a switch connected in parallel relation to the impedance and a switch actuating coil connected in series relation with one of said windings.

3. An arc welding system comprising a transformer having primary and secondary winding, a set of working electrodes connected to the secondary winding, an impedance connected in series with the primary winding, and means for shunting the impedance from the primary circuit when current flows in the secondary windings, said means including a switch connected in parallel relation to the impedance and a switch actuating coil connected in series with the primary winding.

4. An arc welding system comprising a transformer having primary and secondary winding, a set of working electrodes connected to the secondary winding, an impedance connected in series with the primary winding, and means for shunting the impedance from the primary circuit when current flows in the secondary windings, said means including a switch connected in parallel relation to the impedance and a switch actuating coil connected in series relation with the secondary winding.

5. An arc welding system comprising a transformer having primary and secondary winding, a set of working electrodes connected to the secondary winding, an impedance connected in series with the primary winding, and means for shunting the impedance from the primary circuit when current flows in the secondary windings, said means including a switch connected in parallel relation to the impedance and switch actuating coils connected one in series with each of the primary and secondary coils.

6. An arc welding system comprising a transformer having primary and secondary windings, a set of working electrodes connected to the secondary winding, an impedance connected in series with the primary winding, a switch adapted to shunt the impedance from the primary circuit, a resilient member always tending to open the switch and means controlled by the welding operations for closing it.

7. An arc welding system comprising a transformer having primary and secondary winding, a set of working electrodes connected to the secondary winding, an impedance connected in series with the primary winding, a switch adapted to shunt the impedance from the primary circuit, a resilient member always tending to open the switch and a switch actuating coil connected in series relation with either or both the windings for opening it.

In witness whereof, we affix our signatures.

WALTER HERBERT FLOOD.
DONALD TRENTHAM SMOUT.